June 22, 1937.　　　　　F. C. FRANK　　　　　2,084,391
WHEEL
Filed Dec. 21, 1931　　　2 Sheets-Sheet 1

INVENTOR.
FREDERICK C. FRANK
BY
ATTORNEY

June 22, 1937.  F. C. FRANK  2,084,391
WHEEL
Filed Dec. 21, 1931   2 Sheets-Sheet 2

INVENTOR.
FREDERICK C. FRANK
BY
ATTORNEY

Patented June 22, 1937

2,084,391

UNITED STATES PATENT OFFICE 2,084,391

WHEEL

Frederick C. Frank, South Bend, Ind., assignor to Bendix Aviation Corporation, South Bend, Ind., a corporation of Delaware Application December 21, 1931, Serial No. 582,450

6 Claims. (Cl. 301—6)

This invention relates to wheels and more particularly to that type designed for a low pressure tire.

The invention comprehends a wheel having relatively few parts all of which may be stamped from sheet metal and readily assembled without the use of bolts or other securing devices.

In the illustrated embodiment of the invention the wheel comprises a hub including a cylindrical section having bearing cups abut-welded to its respective ends. The cups have secured thereto radial load carrying discs, one of which is formed integral with a rim having a flange welded to the periphery of the other radial load carrying disc. The rim is braced to the hub by a conical member connecting the hub to the drop center of the rim, and a braking flange is supported on one of the cups and is interlocked with the adjacent radial load carrying disc.

The invention includes other structural features such as the spokes formed integral with the radial load carrying disc, the drum and the particular means of centering and supporting the drum.

An object of the invention is to provide a wheel comprising but few parts all of which may be stamped from sheet metal and assembled without the use of securing devices.

Another object of the invention is to provide a wheel of exceedingly cheap and simple structure including but few parts which may be quickly assembled and will efficiently perform its intended function.

A salient feature of the invention is a radial load carrying disc having formed integral therewith a rim.

Another feature of the invention is a hub including a cylindrical section and two similar bearing cups abut-welded to the cylindrical section.

A further feature of the invention is a wheel having a radial load carrying disc, a plurality of spokes, an auxiliary load carrying disc secured to the spokes, and means on the auxiliary load carrying disc supporting a drum.

Yet a further feature of the invention is a brake drum including a strip of metal having spaced notches on one edge and a flange on the other, the strip being rolled and having its ends abut-welded to provide a brake drum. This drum is positioned in an offset portion provided in an auxiliary load carrying disc and the notches in the drum receiving the spokes associated with the disc.

Other objects and features of the invention will readily appear from the following description taken in connection with the drawings, in which.

Figure 1:
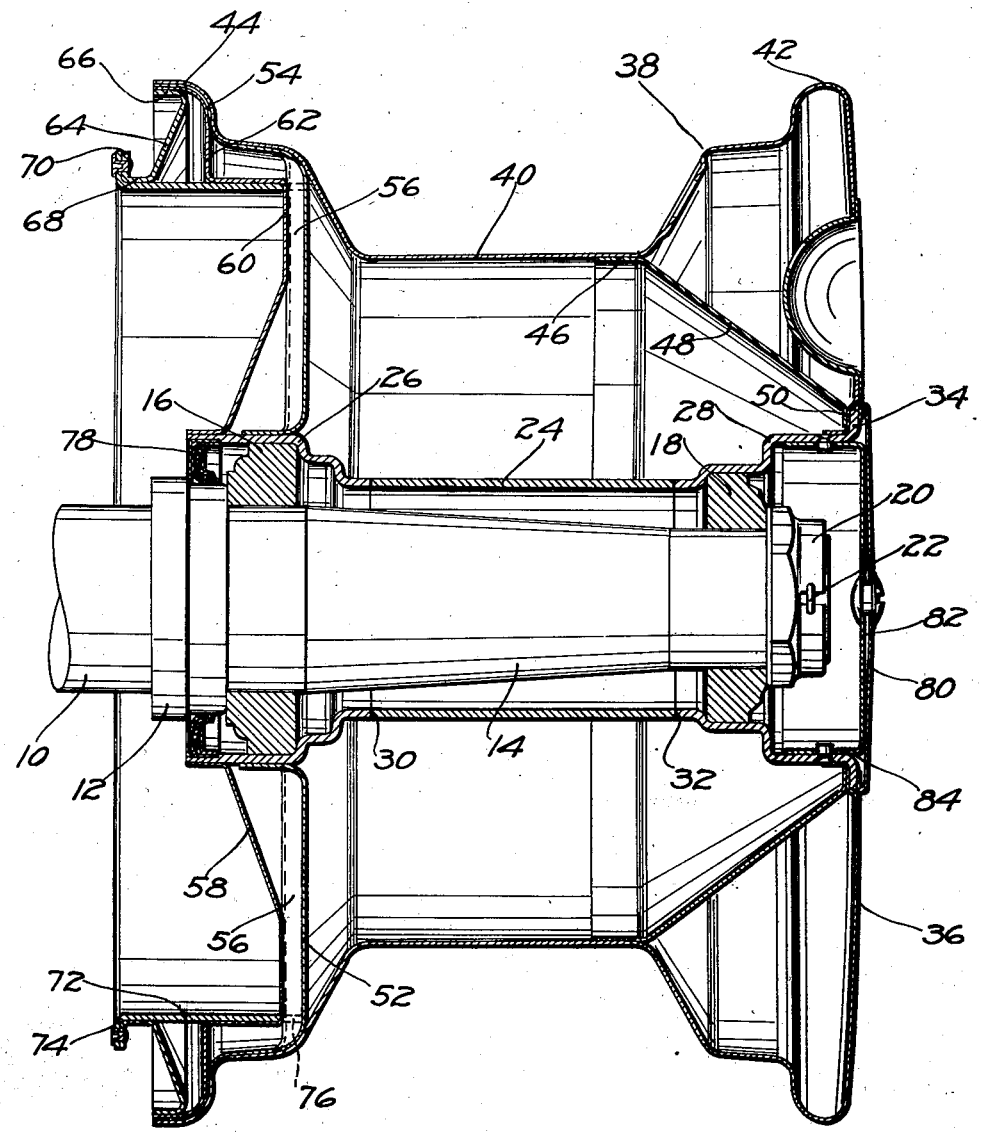
Figure 1 is a vertical sectional view of a wheel embodying the invention.
Figure 2:
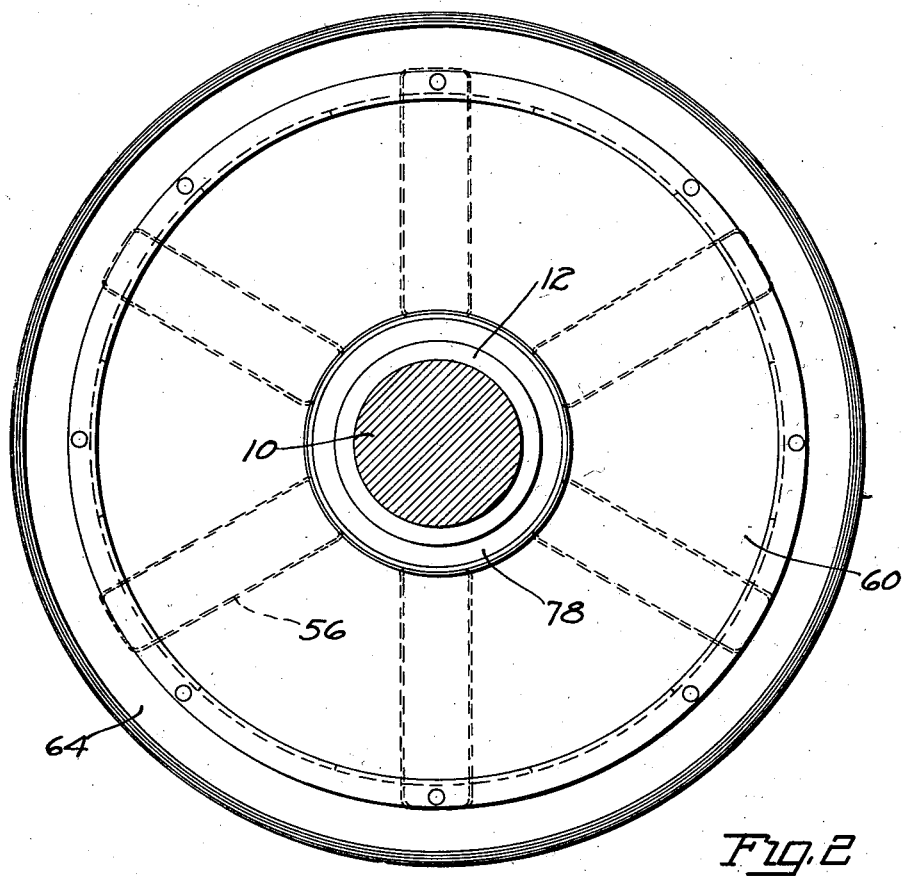
Figure 2 is a side elevation of the wheel.

Referring to the drawings for more specific details of the invention, 10 represents an axle having a shoulder 12 and a spindle 14. A wheel is positioned for rotation on the axle on suitable bearings 16 and 18. The wheel is retained against displacement by a nut 20 threaded on the end of the spindle and the nut is locked in position by the conventional cotter pin 22.

The wheel comprises a hub including a cylindrical section 24 and bearing cups 26 and 28. The bearing cups 26 and 28 are abut-welded to the respective ends of the cylindrical section as indicated at 30 and 32. The bearing cup 26 receives the bearing 16 and the bearing cup 28 receives the bearing 18. It is, of course, understood that the bearings are placed in the cups preparatory to placing the wheel on the axle.

The bearing cup 28 is provided with a circumferential flange 34 to which is secured a radial load carrying disc 36. This disc is formed integral with a rim 38. In forming the radial load carrying discs and the rim 38 the disc is stamped integral with a cylindrical section which is then rolled to provide a rim having the conventional drop center 40 and retaining flanges 42 and 44. The rim is welded to a flange 46 on a cone shaped member 48 having a flange 50 abutting the radial load carrying disc 36. The flange 34 on the cup 28, the radial load carrying disc 36, and the flange 50 on the cone shaped member 48 are simultaneously seam welded together.

A radial load carrying disc 52 is welded on the bearing cup 26. This disc is provided with a flange 54 which is lapped against the flange 44 on the rim 40. Arranged in spaced relation on the radial load carrying disc 52 are spokes 56 formed integral with the radial load carrying disc. As shown, the spokes are stamped from the disc and are so formed as to lend strength and rigidity to the structure.

Secured to the bearing cup 26 is a drum supporting disc 58 having an offset portion 60 secured to the spokes in any suitable manner, and a flange 62 corresponding to the flange 54 on the radial load carrying disc 52. A cone shaped ring 64 has a flange 66 flapped against the flange 62 on the drum supporting disc and a flange 68 arranged to coincide with the offset portion on the brake supporting disc 58 and a peripheral flange 70 to which is suitably secured a braking flange 72 to be hereinafter described. The flanges 44, 54, 62 and 66 are welded together.

Figure 3:
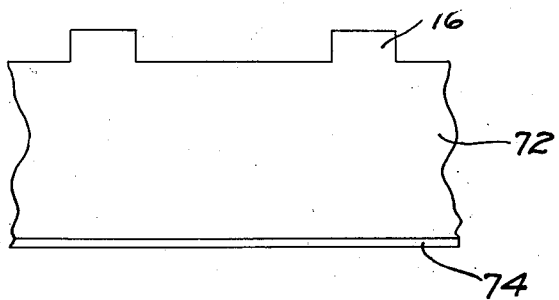
Figure 3 is a detailed view of the braking drum illustrating a stamped blank before it is rolled to form the drum.

The braking flange 72 is stamped in the form illustrated in Figure 3 wherein a single strip is provided with a flange 74 and a plurality of oppositely disposed tongues 76 arranged in spaced relation. After the strip has been stamped, it is deformed to provide a split drum, the adjacent ends of which are abut-welded. The drum is then slipped in the offset portion 60 with the tongues 76 extending through slots in the disc 58 and engaging the spokes to take the torque. The flange on the drum is suitably secured as by rivets or bolts to the flange 70 on the ring 64.

Fitted snugly in the bearing cup 26 is a grease retaining or dust washer 78 and suitably secured on the front end of the hub is a cap 80 held in position by a cup 82 slipped in the bearing cup 28 and secured in position by the conventional bayonet joint 84.

It is to be observed that in the structure described there is provided a wheel comprising relatively few parts all of which may be readily stamped from sheet metal and assembled without the use of bolts, rivets or other securing devices, and that the component parts are of such character that they may be stamped without excessive stretching of the metal. It is also to be observed that in the assembly of parts the arrangement is such as to lend strength and rigidity to the structure as a whole.

While the preferred embodiment of the invention has been described, it is to be understood that this is merely given as an example of the underlying principle of the invention, and since this principle may be incorporated in other specific mechanical structures, I do not intend to be limited to that shown except as such limitations are clearly imposed by the appended claims.

Having thus described the various features of the invention what I claim as new and desire to secure by Letters Patent is:

1. A wheel comprising a hub, a radial load carrying disc secured thereto, a flange on the radial load carrying disc, spokes on the radial load carrying disc, a drum supporting disc secured to the hub having an offset portion secured to the spokes, a flange on the drum supporting disc corresponding to the flange on the radial load supporting disc and secured thereto, a conical member secured to the flange on the drum supporting disc, and a drum having a flange secured to the conical member.

2. A wheel comprising a hub, a radial load carrying disc secured to the hub, a drop center rim formed integral with the disc, a conical member bracing the adjacent side of the drop center to the disc, a second radial load carrying disc connecting the rim to the hub, spokes on the second disc, a drum supporting disc on the hub having an offset portion, and a drum supported in the offset portion having means interlocking the drum with the spokes.

3. A wheel comprising a hub, a radial spoked load carrying disc secured to the hub, a drum supporting disc adjacent thereto having a cylindrical offset portion located between its inner and outer peripheries and a conical portion secured to the hub, a cylindrical braking drum carried within said cylindrical portion and of greater axial length than said cylindrical portion, said drum having axial tongues extending through said drum supporting disc and engaging said spokes, and a conical member securing the outer rim of said braking drum to the outer periphery of said supporting disc, the portion of said drum supporting disc immediately toward the center from said drum, engaging said load carrying disc thereby laterally bracing the same.

4. A wheel comprising a drum supporting disc having a cylindrical offset portion located between its inner and outer peripheries, a cylindrical braking drum carried within said cylindrical portion and of greater axial length than said cylindrical portion, and a conical member securing the outer rim of said braking drum to the outer periphery of said supporting disc.

5. A wheel comprising a hub having opposed bearing cups and a cylindrical portion therebetween, a radial load carrying disc secured to one of said cups, a drop center rim integral with the radial load carrying disc, a conical brace member extending from the adjacent side of and underneath the drop center of said rim to said bearing cup, and a second radial load carrying disc connecting the other bearing cup to the rim adjacent the other side of said drop center.

6. A wheel comprising a hub, a radial load carrying disc secured thereto, spokes stamped from the radial load carrying disc, a drum supporting disc secured to the hub at a point spaced from said radial load carrying disc, said drum supporting disc having a conical portion and a radial offset portion adapted to engage the spokes and a drum having a flange secured on the drum supporting disc in said offset, said flange being secured to the radial load carrying disc.

FREDERICK C. FRANK.